(12) United States Patent
Fukase

(10) Patent No.: US 7,448,296 B2
(45) Date of Patent: Nov. 11, 2008

(54) BRAKE PEDAL APPARATUS

(75) Inventor: Akihiko Fukase, Toyota (JP)

(73) Assignee: Toyoda Iron Works Co., Ltd., Toyota-shi, Aichi-ken (JP)

( * ) Notice: Subject to any disclaimer, the term of this patent is extended or adjusted under 35 U.S.C. 154(b) by 386 days.

(21) Appl. No.: 11/401,838

(22) Filed: Apr. 12, 2006

(65) Prior Publication Data

US 2006/0260429 A1    Nov. 23, 2006

(30) Foreign Application Priority Data

May 17, 2005    (JP)    ............................ 2005-144697

(51) Int. Cl.
G05G 1/04    (2006.01)
(52) U.S. Cl. ...................................... 74/516
(58) Field of Classification Search .................. 74/512, 74/516–518, 560
See application file for complete search history.

(56) References Cited

U.S. PATENT DOCUMENTS

| | | | | |
|---|---|---|---|---|
| 3,861,237 A | * | 1/1975 | Mounts | 74/516 |
| 3,911,760 A | * | 10/1975 | Elbers et al. | 74/512 |
| 3,988,945 A | * | 11/1976 | Fasano | 74/512 |
| 4,638,680 A | * | 1/1987 | Albrecht | 74/516 |
| 5,823,064 A | * | 10/1998 | Cicotte | 74/512 |
| 7,017,441 B2 | * | 3/2006 | Hayashihara et al. | 74/512 |
| 7,219,576 B2 | * | 5/2007 | Leonard et al. | 74/518 |

FOREIGN PATENT DOCUMENTS

| | | |
|---|---|---|
| JP | 5-185912 | 7/1993 |
| JP | 7-205776 | 8/1995 |

* cited by examiner

*Primary Examiner*—Chong H Kim
(74) *Attorney, Agent, or Firm*—Finnegan, Henderson, Farabow, Garrett & Dunner, LLP.

(57) ABSTRACT

The present invention is, in a brake pedal apparatus having: (a) an operating pedal which is disposed pivotably about a first axis; (b) a pivot member which is disposed pivotably about a second axis parallel to the first axis, and which is connected to the operating pedal via a connecting link so as to be mechanically pivoted about the second axis in response to a depressing operation effected on the operating pedal; and (c) an output member which is to be mechanically pressed or pulled as a result of pivot motion of the pivot member, in that: (d) the connecting link has a first link disposed on a member on a side of the operating pedal pivotably about a first connecting pin parallel to the first axis, and a second link disposed on a member on a side of the pivot member pivotably about a second connecting pin parallel to the first axis; (e) the first and second links are connected to each other via a third connecting pin pivotably relative to each other, and are integrally displaced with constant attitudes thereof that have the third connecting pin positioned on a straight line connecting the first and second connecting pins in a first region of a pedal stroke of the operating pedal; and (f) in a second region that is different from the first region, one of the first and second links is in contact with a stopper that is provided on the member on the side of the operating pedal or on the member on the side of the pivot member, so as to be unpivotably positioned, whereby the first and second links are pivoted relative to each other about the third connecting pin.

10 Claims, 9 Drawing Sheets

FIG.5
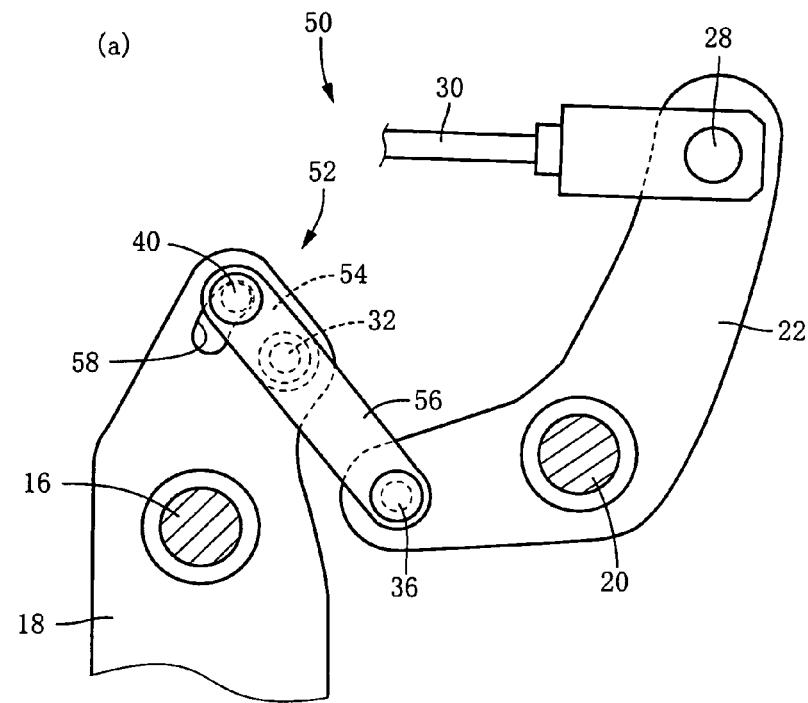
(a)
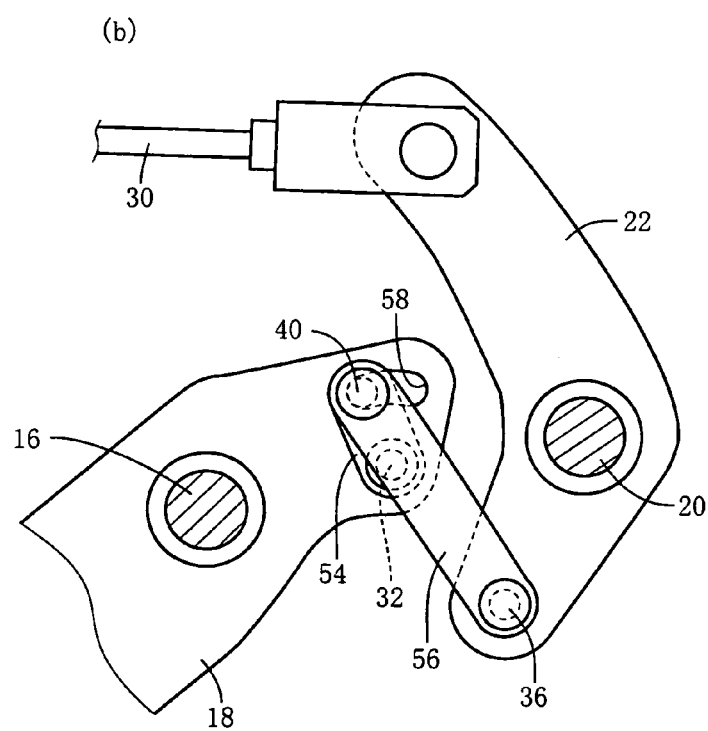
(b)

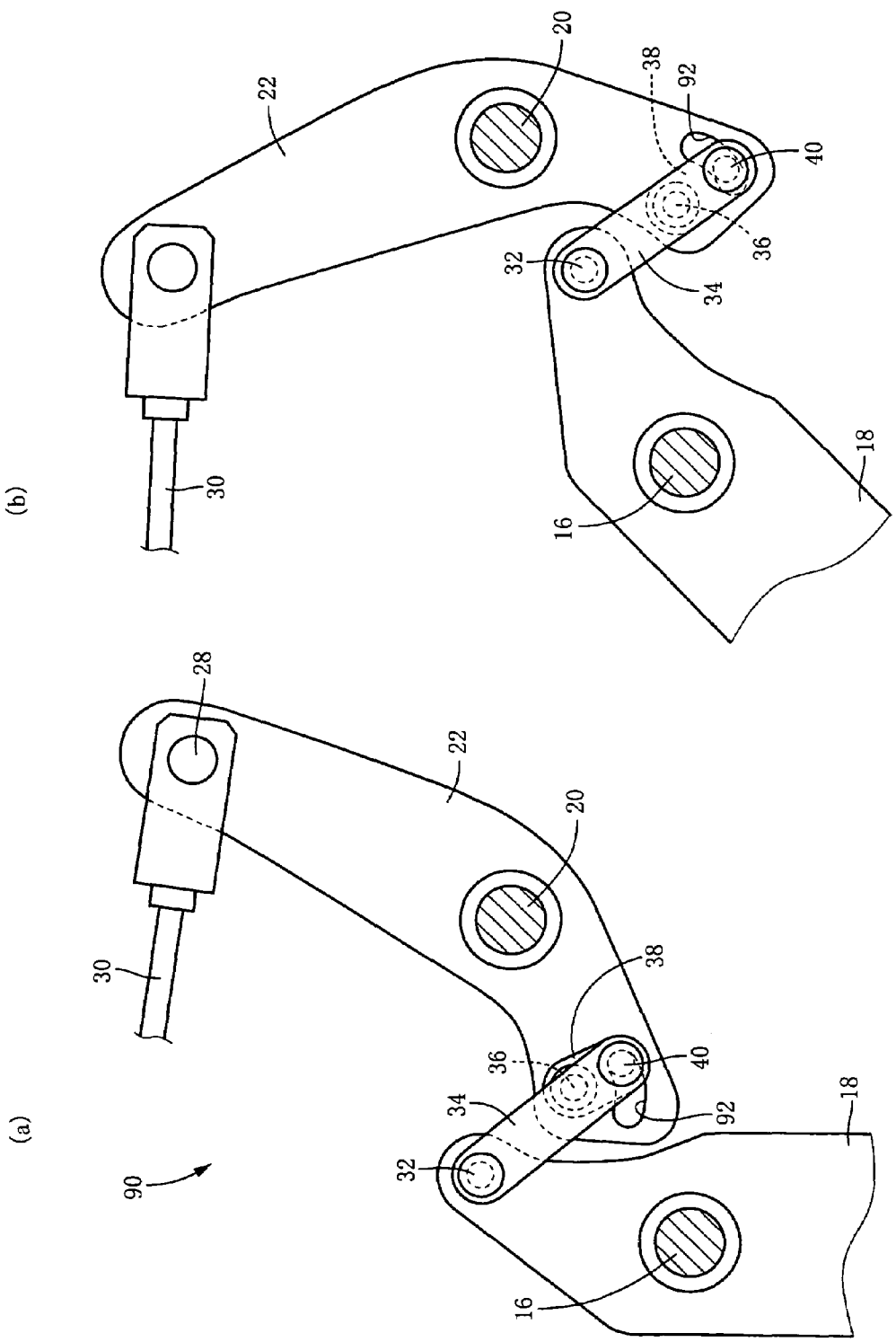

US 7,448,296 B2

BRAKE PEDAL APPARATUS

This application is based on Japanese Patent Application No. 2005-144697, the content of which is incorporated hereinto by reference.

BACKGROUND OF THE INVENTION

1. Field of the Invention

The present invention relates in general to a brake pedal apparatus, and more particularly to such a brake pedal apparatus having a high degree of freedom in setting of a lever ratio characteristic.

2. Discussion of Prior Art

There is known a brake pedal apparatus having (a) an operating pedal which is disposed pivotably about a first axis, (b) a pivot member which is disposed pivotably about a second axis parallel to the first axis, and which is connected to the operating pedal via a connecting link so as to be mechanically pivoted about the second axis in response to a depressing operation effected on the operating pedal; and (c) an output member which is to be mechanically pressed or pulled as a result of pivot motion of the pivot member. As an example of such a brake pedal apparatus, Patent Document 1 discloses an apparatus in which a lever ratio representative of a ratio of an output to a depression force acting on the operating pedal is changed in accordance with a pedal stroke. Further, Patent Document 2 discloses a technique for transmitting a depression force from an operating pedal to a pivot member by employing a cam and a roller in place of the above-described connecting link.

Patent Document 1: JP-H7-205776A
Patent Document 2: JP-H5-185912A

However, in such a conventional brake pedal apparatus, since a characteristic of change of the lever ratio (lever ratio characteristic) is dependent on connected positions of the connecting link and contour of the cam, it is difficult to largely change the lever ratio halfway during the pedal stroke. Thus, the change in the lever ratio is not necessarily satisfactory.

The present invention was made in the light of the background art discussed above. It is therefore an object of the invention to provide a bake pedal apparatus which is capable of easily changing the lever ratio by a large amount halfway during the pedal stroke and which has a high degree of freedom in setting of a lever ratio characteristic.

SUMMARY OF THE INVENTION

For achieving the above object, the present invention provides a brake pedal apparatus having: (a) an operating pedal which is disposed pivotably about a first axis; (b) a pivot member which is disposed pivotably about a second axis parallel to the first axis, and which is connected to the operating pedal via a connecting link so as to be mechanically pivoted about the second axis in response to a depressing operation effected on the operating pedal; and (c) an output member which is to be mechanically pressed or pulled as a result of pivot motion of the pivot member, the brake pedal apparatus is characterized in that: (d) the connecting link has a first link disposed on a member on a side of the operating pedal pivotably about a first connecting pin parallel to the first axis, and a second link disposed on a member on a side of the pivot member pivotably about a second connecting pin parallel to the first axis; (e) the first and second links are connected to each other via a third connecting pin pivotably relative to each other, and are integrally displaced with constant attitudes thereof that have the third connecting pin positioned on a straight line connecting the first and second connecting pins in a first region of a pedal stroke of the operating pedal; and (f) in a second region that is different from the first region, one of the first and second links is in contact with a stopper that is provided on the member on the side of the operating pedal or on the member on the side of the pivot member, so as to be unpivotably positioned, whereby the first and second links are pivoted relative to each other about the third connecting pin.

The second invention is, in the brake pedal apparatus of the first invention, characterized in that the stopper is brought into contact with the third connecting pin so as to unpivotably position one of the first and second links.

The third invention is, in the brake pedal apparatus of the first invention, characterized in that one of the first and second links, which is to be brought into contact with the stopper so as to be unpivotably positioned, passes the third connecting pin and projects toward one of opposite sides of the third connecting pin that is remote from the first and second connecting pins, the one of the first and second links having an engaging portion which is provided on an outside of the third connecting pin and which is to be brought into contact with the stopper.

In the brake pedal apparatus, in the first region, the first and second links are integrally displaced, providing substantially the same lever ratio as in a case where the first and second connecting pins are connected via a single link. On the other hand, in the second region in which one of the first and second links is in contact with the stopper so as to be positioned, the first and second links are pivoted relative to each other about the third connecting pin, providing substantially the same lever ratio as in a case where the connection is made by individually disposing the first or second link, differently from the first region. That is, in the first region, the lever ratio characteristic is dependent on positions of the first and second connecting pins. In the second region, the lever ratio characteristic is dependent on a length dimension of the first or second link (strictly speaking, a dimension between the first or second connecting pin and the third connecting pin). Further, the first and second regions can be suitably set depending on a position of the stopper.

Thus, the lever ratio characteristic in the first region and that in the second region can be set independently of each other, and the first and second regions can be suitably set, so that the lever ratio can be easily changed by a large amount at an arbitrary position during the pedal stroke, thereby improving a degree of freedom in setting of the lever ratio characteristic and providing a further excellent braking operation feeling.

In the second invention, the stopper is brought into contact with the third connecting pin, whereby one of the first and second links is unpivotably positioned. This arrangement can be constructed easier and cheaper than a case where a member such as an engaging pin is additionally provided to be brought into contact with the stopper.

In the third invention, one of the first and second links, which is to be brought into contact with the stopper so as to be unpivotably positioned, passes the third connecting pin and projects toward one of opposite sides of the third connecting pin that is remote from the first and second connecting pins, and the one of the first and second links has the engaging portion which is to be brought into contact with the stopper and which is provided on the outside of the third connecting pin. This arrangement increases a distance from the first or second connecting pin to the engaging portion, thereby amplifying a movement amount of the engaging portion. It is therefore possible to highly accurately control a pivot position of the first or second link in which the first or second link is brought into contact with the stopper, namely, a boundary between the first and second regions of the pedal stroke.

The first link is, for example, connected directly to the operating pedal, while the second link is, for example, connected directly to the pivot member. However, another link may be interposed between the first or second link and the operating pedal or pivot member.

Further, in the first region, the third connecting pin is positioned in a position which lies on a straight line connecting the first and second connecting pins and which is located outside the first and second connecting pins, for example, so that a compressive force acts between the first and second connecting pins. However, the construction may be modified such that the third connecting pin is positioned in a position which lies on a straight line connecting the first and second connecting pins and which is located inside the first and second connecting pins, so that a tensile force acts between the first and second connecting pins.

The stopper defining the second region is disposed on the operating pedal, for example, for positioning the first link. However, the construction may be modified such that the stopper is disposed on the pivot member, for positioning the second link. Further, the stopper is arranged to be brought into contact with, for example, the third connecting pin, although the stopper may be arranged to be brought into contact with any portion of the first or second link. That is, the first or second link is provided with the engaging portion (such as an engaging pin) that is brought into contact with the stopper. The third connecting pin may be also arranged to serve also as the engaging portion that is to be brought into contact with the stopper. The first or second link may be also arranged to extend beyond the third connecting pin, so that the engaging portion can be provided outside the third connecting pin.

The stopper positioning the third connecting pin will be described specifically. The third connecting pin is received in an elongated hole, which is formed in the operating pedal so as to extend along an arc whose center lies at the first connecting pin, for example. In the first region, the third connecting pin is moved within the elongated hole. In the second region, the third connecting pin is held in contact with an end (serving as the stopper) of the elongated hole, whereby the third connecting pin is positioned. The construction may be modified such that the third connecting pin is received in an elongated hole, which is formed in the pivot member so as to extend along an arc whose center lies at the second connecting pin, for example. In the first region, the third connecting pin is moved within the elongated hole. In the second region, the third connecting pin is held in contact with an end (serving as the stopper) of the elongated hole, whereby the third connecting pin is positioned. It is noted that the elongated hole may be replaced with a cutout that allows movement of the third connecting pin.

The first and second regions are set, for example, to correspond to a first half and a second half of the entire pedal stroke, respectively. However, the first region does not necessarily have to precede the second region, but may follow the second region. Further, each of the first and second regions does not necessarily have to correspond to a half of the entire pedal stroke, but may be suitably set, for example, such that one of the first and second regions corresponds to about one-third or less of the entire pedal stroke.

A pair of stoppers may be provided to define opposite ends of the pivot motion of the first or second link, such that the first and second links are integrally displaced in an intermediate part (first region) of the pedal stroke, and such that the first or second link is positioned by the stoppers whereby the first and second links are pivoted relative to each other before and after the intermediate part, i.e., on opposite sides (second region) of the intermediate part.

Further, the pedal stroke can be divided into three or more regions having respective lever ratio characteristics different from each other, for example, by an arrangement including a plurality of lever-ratio-characteristic switching mechanisms which are disposed in series and which are constituted by the first and second links and the stopper.

In the brake pedal apparatus of the present invention, the lever ratio characteristics in the respective first and second regions of the pedal stroke are set to be different from each other. The lever ratio characteristic in each of the first and second regions is adapted such that the lever ratio is changed in accordance with the pedal stroke. However, the link mechanism may be disposed in a manner forming a parallelogram link, for establishing, in any one of the first and second regions, a lever ratio characteristic permitting the lever ratio to be held substantially constant as in an arrangement in which the output member is connected directly to the operating pedal.

The output member is provided by, for example, by a rod of a brake booster that is to be pressed in response to a depressing operation effected on the operating pedal. However, the output member may be provided by a brake cable that is to be pulled in response to the depressing operation. Further, the present invention is applicable also to an electric brake system in which a braking force is controlled by electrically detecting load applied to the output member and displacement of the output member.

The brake pedal apparatus of the present invention is advantageously applied to a service braking system. However, the brake pedal apparatus can be applied to a parking braking system, too.

BRIEF DESCRIPTION OF THE DRAWINGS

FIG. 5 is a set of front views corresponding to the view (a) of FIG. 2 and explaining another embodiment of the present invention, wherein the view (a) shows a state in which the operating pedal is held in its home position, while the view (b) shows a state in which the operating pedal is depressed to substantially its full stroke position.

FIG. 9 is a view corresponding to FIG. 5 and explaining still another embodiment of the present invention.

DETAILED DESCRIPTION OF THE INVENTION

There will be described in detail embodiments of the present invention, with reference to the drawings.

Figure 1:
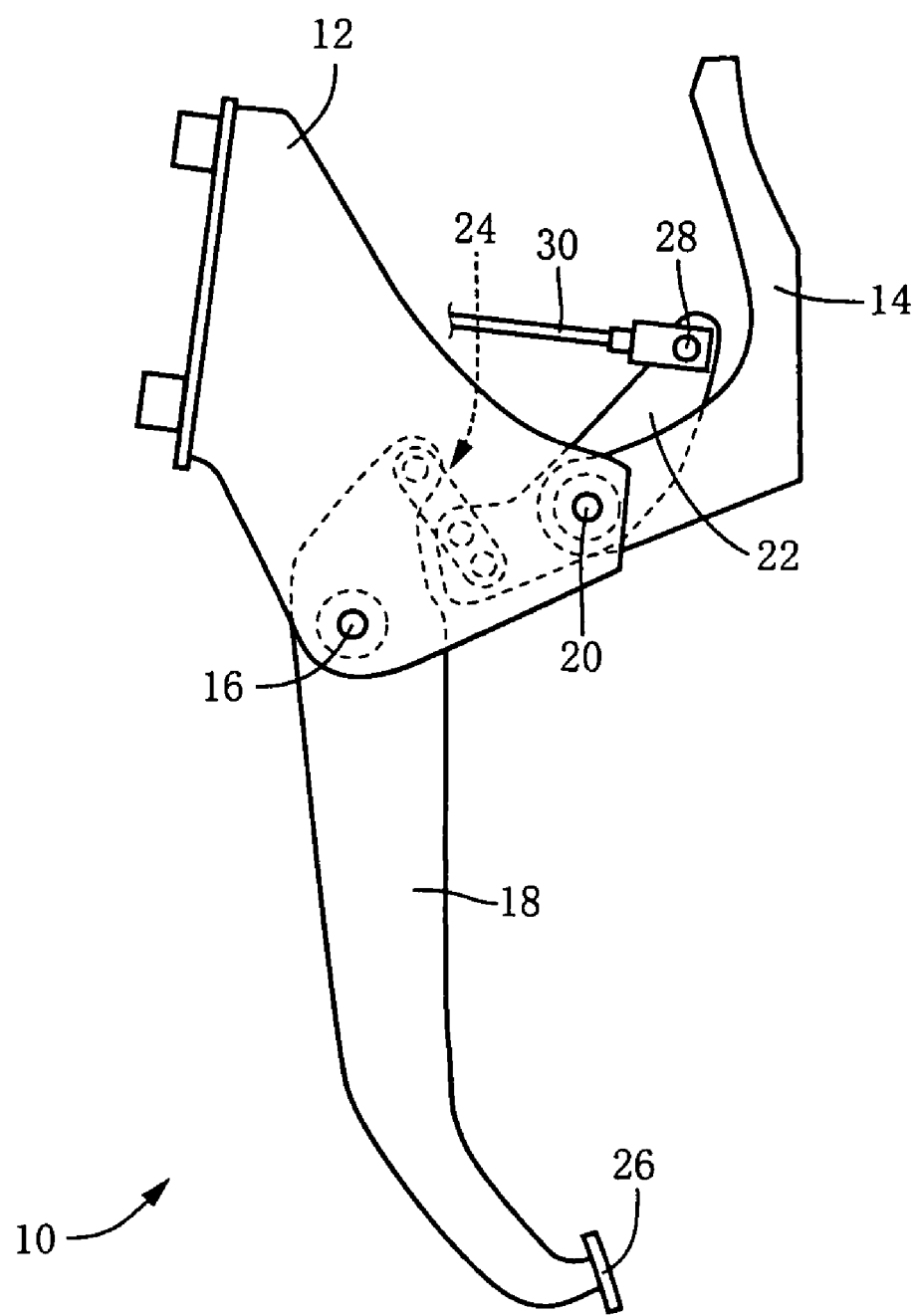
FIG. 1 is a front view schematically showing a brake pedal apparatus as embodiment of the present invention.

FIG. 1 is a front view schematically showing an embodiment of the invention in the form of a brake pedal apparatus 10 that is to be used for a service braking system of a vehicle. This brake pedal apparatus 10 is provided in brackets 12, 14 that are integrally fixed to a body of the vehicle. An operating pedal 18 is provided in the bracket 12, so as to be pivotable about an axis of a first support shaft 16 that is substantially horizontal. The brackets 12, 14 are connected through a second support shaft 20 on which a pivot member 22 is mounted to be pivotable about an axis of the second support shaft 20. A link mechanism 24 is provided to extend between the operating pedal 18 and the pivot member 22. The first and second support shafts 16, 20 are held in parallel to each other, and the axes of the first and second support shafts 16, 20 correspond to a first axis and a second axis, respectively.

The operating pedal 18, when a pedal pad 26 provided in its lower end portion is depressed by a driver of the vehicle, is pivoted clockwise about the first support shaft 16 as seen in FIG. 1, thereby causing the pivot member 22 to be mechanically pivoted counterclockwise about the second support shaft 20, through the link mechanism 24 that is connected to an upper end portion of the operating pedal 18. A rod 30 is connected to an upper end portion of the pivot member 22, so as to be pivotable relative to the pivot member 22 about an axis of a connecting pin 28 that is parallel to the second support shaft 20. As a result of the pivot motion of the pivot member 22, the rod 30 is mechanically pressed leftward as seen in FIG. 1, and pushes a push rod of a master cylinder (not shown), for generating a hydraulic brake pressure. The rod 30 is biased to project outwardly of the brake booster. Therefore, when the pedal pad 26 is released from the depressing operation effected thereon, the biasing force of the rod 30 causes the pivot member 22 to be pivoted back clockwise about the second support shaft 20, and the operating pedal 18 to be pivoted back counterclockwise about the first support shaft 16 so as to be held in its home position as shown in FIG. 1. It is noted that the rod 30 corresponds to an output member.

Figure 2:
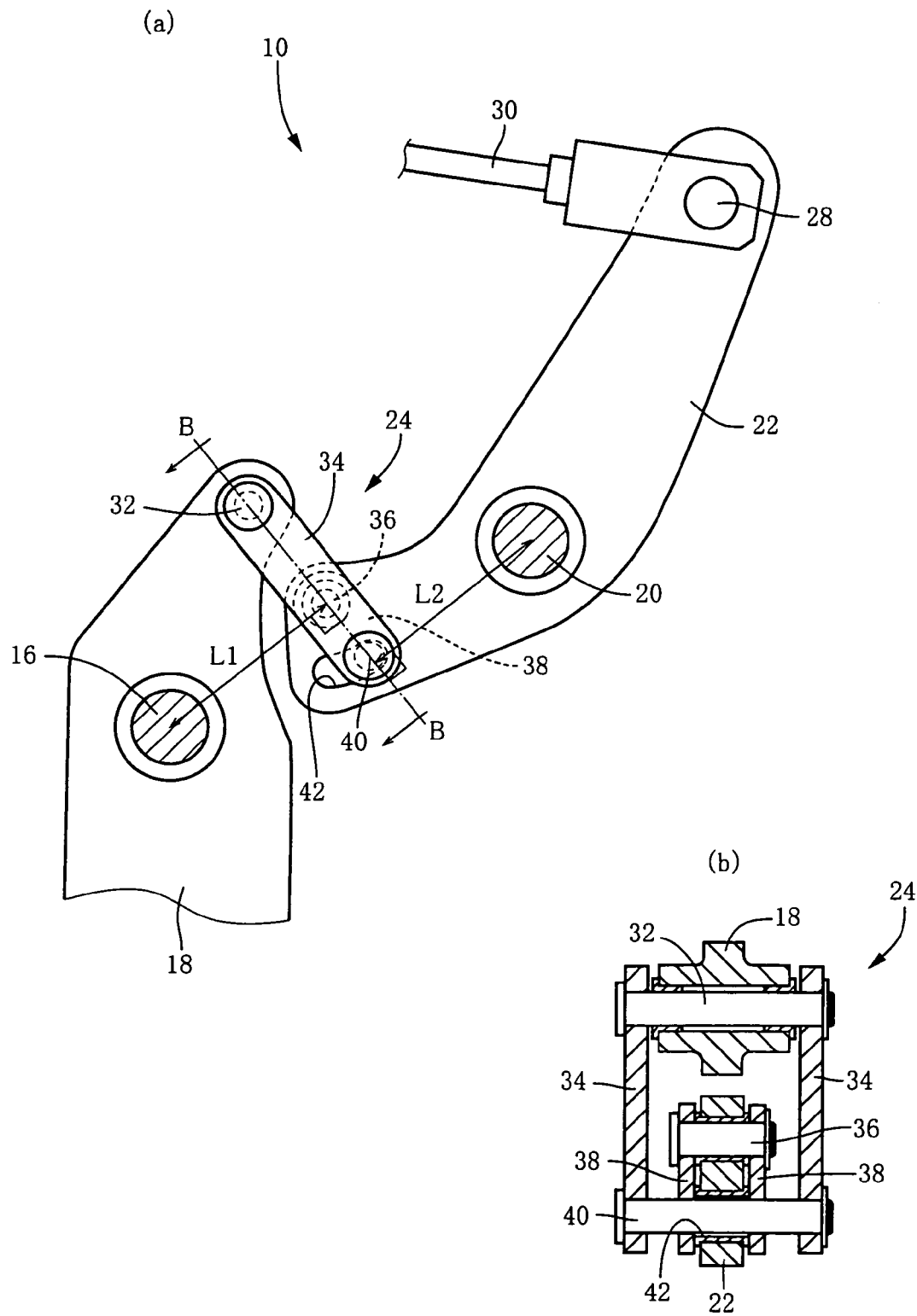
FIG. 2 is a set of views showing in enlargement a link mechanism portion of the embodiment of FIG. 1, wherein the view (a) is a front view showing the link mechanism portion without brackets being illustrated, while the view (b) is a cross sectional view taken along line B-B of the view (a).
Figure 3:
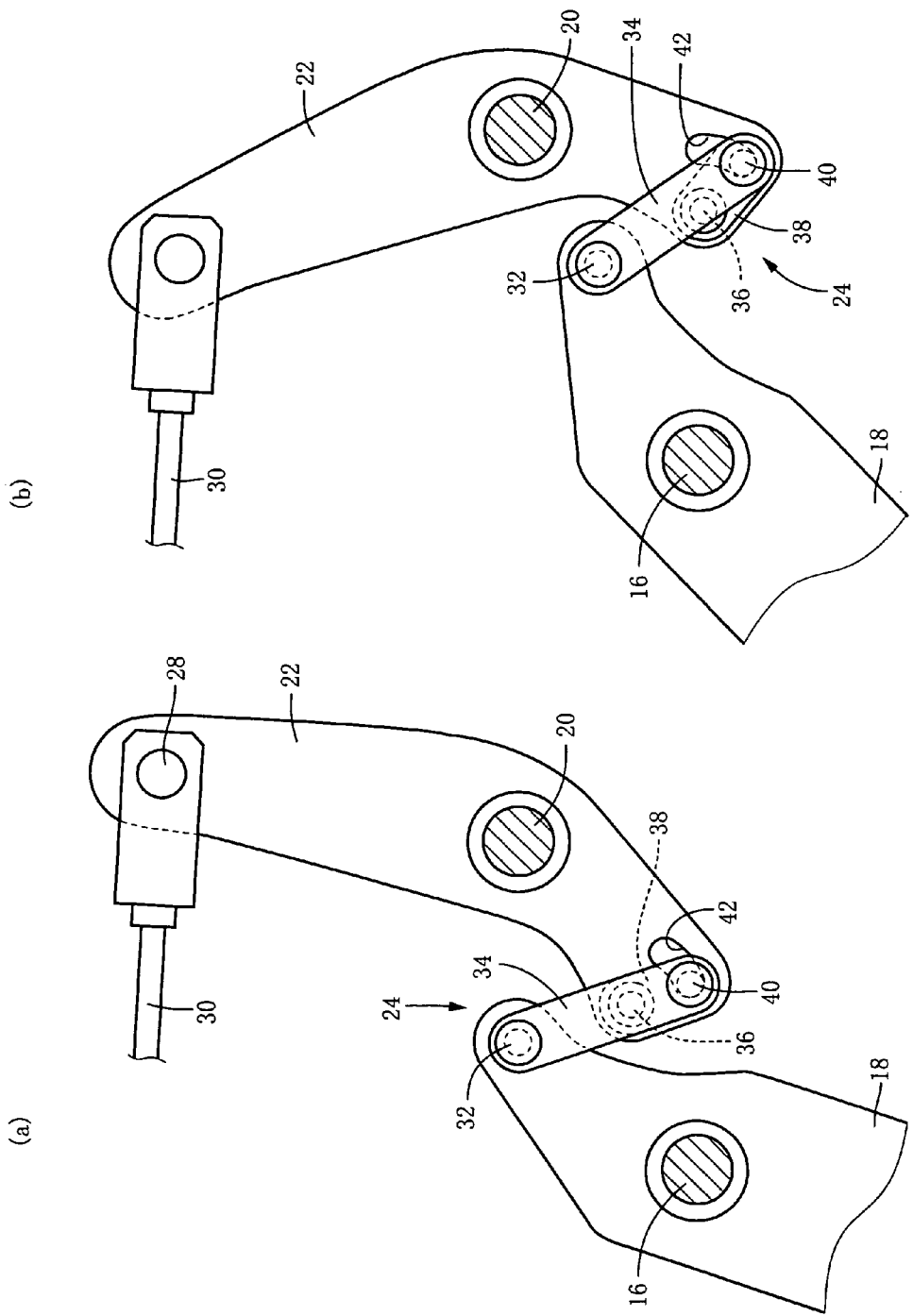
FIG. 3 is a set of front views corresponding to the view (a) of FIG. 2 and showing operating states of the embodiment of FIG. 1, wherein the view (a) shows the state in which an operating pedal is in its intermediate position SP1, while the view (b) shows the state in which the operating pedal is depressed to substantially its full stroke position.

As shown in FIGS. 2 and 3, the link mechanism 24 is equipped with: a first link 34 that is disposed on an upper end portion of the operating pedal 18 via a first connecting pin 32 parallel to the first support shaft 16, pivotably relative to the operating pedal 18; and a second link 38 that is disposed on a lower end portion of the pivot member 22 via a second connecting pin 36 parallel to the first support shaft 16, pivotably relative to the pivot member 22. The first link 34 is sufficiently longer than the second link 38. Each of the first and second links 34, 38 is connected at one of its opposite end portions to a corresponding one of the first and second connecting pins 32, 36, and is connected at the other end portion to each other via a third connecting pin 40 parallel to the first support shaft 16, pivotably relative to each other. Each of the first and second links 34, 38 is provided by a pair of members that are disposed on opposite sides of the operating pedal 18 or pivot member 22. The connecting pin 32 is provided to extend between the pair of members of the first link 34. The connecting pin 36 is provided to extend between the pair of members of the second link 38. The connecting pin 40 is provided to extend between the total of four members of the first and second links 34, 38. A view (a) of FIG. 2 and views (a), (b) of FIG. 3 are front views showing in enlargement without the brackets 12, 14 being illustrated. A view (b) of FIG. 2 is a cross sectional view taken along line B-B of the view (a) of FIG. 2.

Each of the first and second connecting pins 32, 36 is disposed in a predetermined attached portion of a corresponding one of the operating pedal 18 and the pivot member 22, while the third connecting pin 40 is received in an elongated hole 42 that is provided in the pivot member 22, with play between the third connection pin 40 and the elongated hole 42. The elongated hole 42 has an arcuate shape and extends along an arc whose center corresponds to the second connecting pin 36. The third connecting pin 40 is thus arranged to be movable within the elongated hole 42 without interfering with the pivot member 22. While the operating pedal 18 is positioned between its home position (in which a pedal operating amount is zero) as shown in FIG. 2 and its intermediate position SP1 (see FIG. 4), the third connecting pin 40 is positioned on a straight line connecting the first and second connecting pins 32, 36, so that the first and second links 34, 38 are superposed on each other and integrally displaced. That is, the brake pedal apparatus 10 of the present embodiment is of press type in which the operating pedal 18, when a depressing operation is effected thereon, is pivoted clockwise about the first support shaft 16, thereby causing the link mechanism 24 to move the lower end portion of the pivot member 22 in a rightward direction, and causing the pivot member 22 to be pivoted counterclockwise about the second support shaft 20. Between the first and second connecting pins 32, 36, a load acts in a direction causing the first and second connecting pins 32, 36 to be compressed toward each other, and the third connecting pin 40 is held in a position which lies on a straight line connecting the first and second connecting pins 32, 36 and which is located outside the second connecting pin 36.

Therefore, in a first region defined between the home position and the intermediate position SP1 of the pedal stroke of the operating pedal 18, a lever ratio is changed according to a lever ratio characteristic that is substantially the same as in a case where the first and second connecting pins 32, 36 are connected via a single link. The lever ratio is changed according to the lever ratio characteristic that is represented by, for example, a solid line of FIG. 4. This lever ratio characteristic can be adjusted, for example, by changing positions in which the first and second connecting pins 32, 36 are disposed. It is noted that the lever ratio, which is a ratio (=output/input) of an output acting on the rod 30 to a depression force (input) exerted onto the operating pedal 18, is changed as moment arm lengths L1, L2 are changed in accordance with the pedal stroke.

When the operating pedal 18 reaches the intermediate position SP1 of the pedal stroke, the third connecting pin 40 is brought into contact with the end of the elongated hole 42 so as to be positioned, as shown in the view (a) of FIG. 3. In a second region beyond the intermediate position SP1, the second link 38 is not allowed from being clockwise pivoted about the second connecting pin 36, and is held integrally with the pivot member 22, so that the first and second links 34, 38 are pivoted relative to each other about an axis of the third connecting pin 40, as shown in the view (b) of FIG. 3. The view (b) of FIG. 3 shows a state in which the operating pedal 18 is depressed to pass the intermediate position SP1 and reach substantially its full stroke position. Thus, in the second region unlike in the first region, the lever ratio is changed according to a lever ratio characteristic that is substantially the same as in a case where the first link 34 is individually provided to be directly connected to the operating pedal 18 and the pivot member 22 via the connecting pins 32, 40 located in respective positions, as shown in FIG. 3. Where it is designed such that the lever ratio is largely reduced in the second region, for example, as represented by one-dot chain line of FIG. 4, it is possible to provide an increased rigid feeling and accordingly an improved braking operation feeling.

Figure 4:
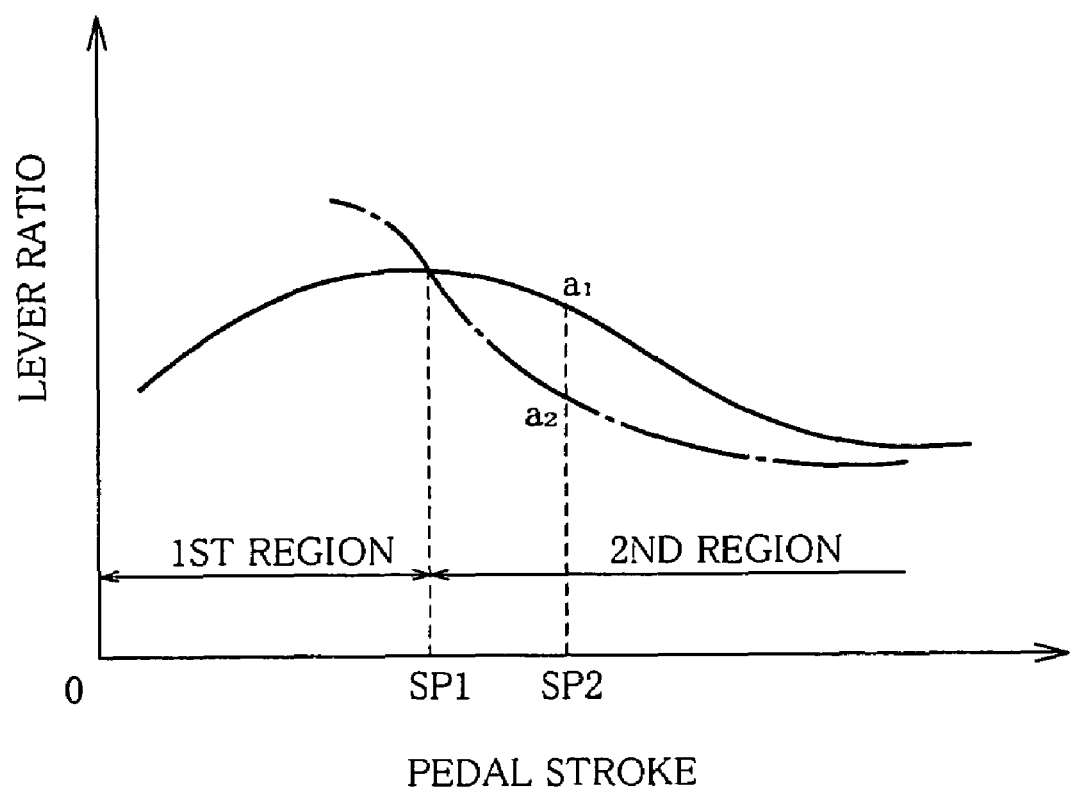
FIG. 4 is a view explaining a lever ratio characteristic of the embodiment of FIG. 1.

That is, if the lever ratio were changed according to the same layer ratio characteristic (solid line of FIG. 4) as in the first region, the lever ratio at a pedal stroke position SP2 would be $a_1$. However, owing to the arrangement inhibiting rotation of the second link 38 in the intermediate position SP1 and thereafter, the layer ratio is rapidly reduced to $a_2$ according to the one-dot chain line, thereby making it possible to shorten the entire pedal stroke while providing a sufficient rigid feeling. This lever ratio characteristic in the second region can be adjusted, for example, by changing the length of the first link 34. Further, the intermediate position SP1 as a boundary between the first and second regions can be adjusted, for example, by changing a length dimension of the elongated hole 42. The end of the elongated hole 42, with which the third connecting pin 40 is brought into contact in the intermediate position SP1, corresponds to a stopper for positioning the second link 38 relative to the pivot member 22. The third connecting pin 40 serves also as an engaging portion that is to be brought into contact with the stopper. It is noted that each of the lever ratio characteristics represented by the solid and one-dot chain lines in FIG. 4 is merely one example, and does not necessarily accurately correspond to the brake pedal apparatus 10 shown in FIGS. 1-3.

The first and second connecting pins 32, 36 are disposed in the operating pedal 18 and the pivot member 22, respectively, via respective bearing sleeves, while a bearing member is disposed on an inner circumferential surface of the elongated hole 42, for providing a durability sufficient for practical use.

As described above, in the brake pedal apparatus 10 of the present embodiment, the lever ratio characteristic in the first region in which the pedal operating amount is smaller than the intermediate position SP1 in the pedal stroke and the lever ratio characteristic in the second region in which the pedal operating amount exceeds the intermediate position SP1 in the pedal stroke can be set independently of each other. Further, the intermediate position SP1 can be changed by changing the length dimension of the elongated hole 42, namely, by changing a position of the end of the elongated hole 42 with which the third connecting pin 40 is to be brought into contact, so that the first and second regions can be suitably defined. Therefore, the lever ratio characteristic can be easily changed by a large amount at an arbitrary position in the pedal stroke, thereby improving a degree of freedom in setting of the lever ratio characteristic and providing a further excellent braking operation feeling.

Further, in the present embodiment, the third connecting pin 40 is brought into contact with the end of the elongated hole 42 functioning as the stopper, whereby the second link 38 is unpivotably positioned relative to the pivot member 22. This arrangement can be constructed easier and cheaper than a case where a member such as an engaging pin is additionally provided to be brought into contact with the stopper.

Next, there will be described other embodiments of the present invention. It is noted that the same reference numerals as used in the above-described embodiment will be used to identify the substantially similar portions, which will not be described in detail.

A link mechanism 52 of a brake pedal apparatus 50 of FIG. 5 includes a first link 54 that is provided to be connected to the operating pedal 18 through the first connecting pin 32, and a second link 56 that is provided to be connected to the pivot member 22 through the second connecting pin 36. The first link 54 is shorter than the second link 56. In the first region in which the pedal operating amount is smaller than the intermediate position SP1 in the pedal stroke, the third connecting pin 40 is positioned in a position which lies on a straight line connecting the first and second connecting pins 32, 36 and which is located outside the first connecting pin 32, and is received in an elongated hole 58 which is provided in the operating pedal 18 and which extends along an arc whose center corresponds to the first connecting pin 32, with play between the third connecting pin 40 and the elongated hole 58. That is, in the first region defined between the home position (which the pedal operating amount is zero) shown in the view (a) of FIG. 5 and the intermediate position SP1, the third connecting pin 40 is positioned on a straight line connecting the first and second connecting pins 32, 36, so that the lever ratio is changed according to a lever ratio characteristic that is substantially the same as in a case where the first and second connecting pins 32, 36 are connected via a single link.

When the pedal operating amount reaches the intermediate position SP1 of the pedal stroke, the third connecting pin 40 is brought into contact with the end of the elongated hole 58 so as to be positioned. In the second region beyond the intermediate position SP1, the first link 54 is not allowed from being counterclockwise pivoted about the first connecting pin 32, and is held integrally with the operating pedal 18, so that the first and second links 54, 56 are pivoted relative to each other about the third connecting pin 40, as shown in the view (b) of FIG. 5. Thus, in the second region unlike in the first region, the lever ratio is changed according to a lever ratio characteristic that is substantially the same as in a case where the second link 56 is individually provided to be directly connected to the operating pedal 18 and the pivot member 22 via the connecting pins 40, 36 located in respective positions, as shown in the view (b) of FIG. 5, thereby providing the same effects as the above-described embodiment. The view (b) of FIG. 5 shows a state in which the operating pedal 18 is depressed to pass the intermediate position SP1 and reach substantially its full stroke position. The end of the elongated hole 58, with which the third connecting pin 40 is brought into contact in the intermediate position SP1, corresponds to the stopper for positioning the first link 54 relative to the operating pedal 18. The third connecting pin 40 serves also as the engaging portion that is to be brought into contact with the stopper.

Figure 6:
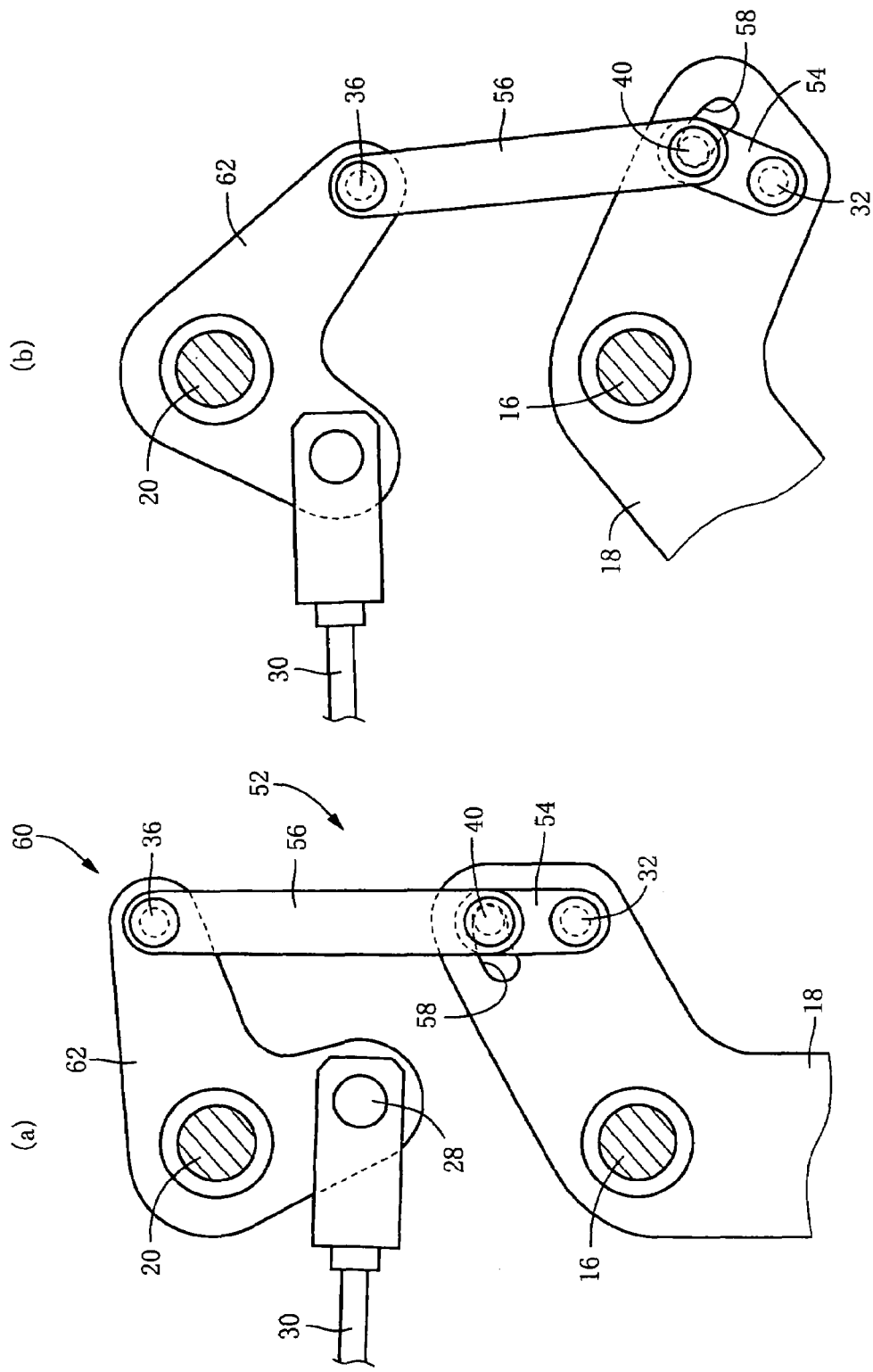
FIG. 6 is a view corresponding to FIG. 5 and explaining still another embodiment of the present invention.

In a brake pedal apparatus 60 of FIG. 6, the third connecting pin 40 is received in the elongated hole 58 provided in the operating pedal 18, as in the above-described brake pedal apparatus 50. However, the brake pedal apparatus 60 is of pull type in which a pivot member 62 is pulled to be pivoted through the link mechanism 52 in the clockwise direction about the second support shaft 20, upon the depressing operation effected on the operating pedal 18. In the first region in which the pedal operating amount is smaller than the intermediate position SP1 in the pedal stroke, the third connecting pin 40 is positioned in a position which lies on a straight line connecting the first and second connecting pins 32, 36 and which is located between the first and second connecting pins 32, 36, and is received in the elongated hole 58 with play between the third connecting pin 40 and the elongated hole 58. That is, in the first region defined between the home position (in which the pedal operating amount is zero) shown in the view (a) of FIG. 6 and the intermediate position SP1, the third connecting pin 40 is positioned on the straight line connecting the first and second connecting pins 32, 36, so that the lever ratio is changed according to a lever ratio characteristic that is substantially the same as in a case where the first and second connecting pins 32, 36 are connected via a single link. In this embodiment, a line segment connecting between the first support shaft 16 and the first connecting pin 32 and a line segment connecting between the second support shaft 20 and the second connecting pin 36 are parallel to each other and have the same length, thereby making it possible to establish an arrangement forming a parallelogram link. In such an arrangement, there is provided a lever ratio characteristic permitting the lever ratio to be held substantially constant irrespective of the pedal stroke, as in an arrangement in which the rod 30 is connected directly to the operating pedal 18. However, this lever ratio characteristic can be suitably changed by changing the lengths of the links and the connected positions of the links.

When the pedal operating amount reaches the intermediate position SP1 of the pedal stroke, the third connecting pin 40 is brought into contact with the end of the elongated hole 58 so as to be positioned. Thus, the present invention is identical with the above-described embodiment in that, in the second region beyond the intermediate position SP1, unlike in the first region, the lever ratio is changed according to a lever ratio characteristic that is substantially the same as in a case where the second link 56 is individually provided to be directly connected to the operating pedal 18 and the pivot member 62 via the connecting pins 40, 36 located in respective positions, as shown in the view (b) of FIG. 6. The view (b) of FIG. 6 shows a state in which the operating pedal 18 is depressed to pass the intermediate position SP1 and reach substantially its full stroke position.

Figure 7:
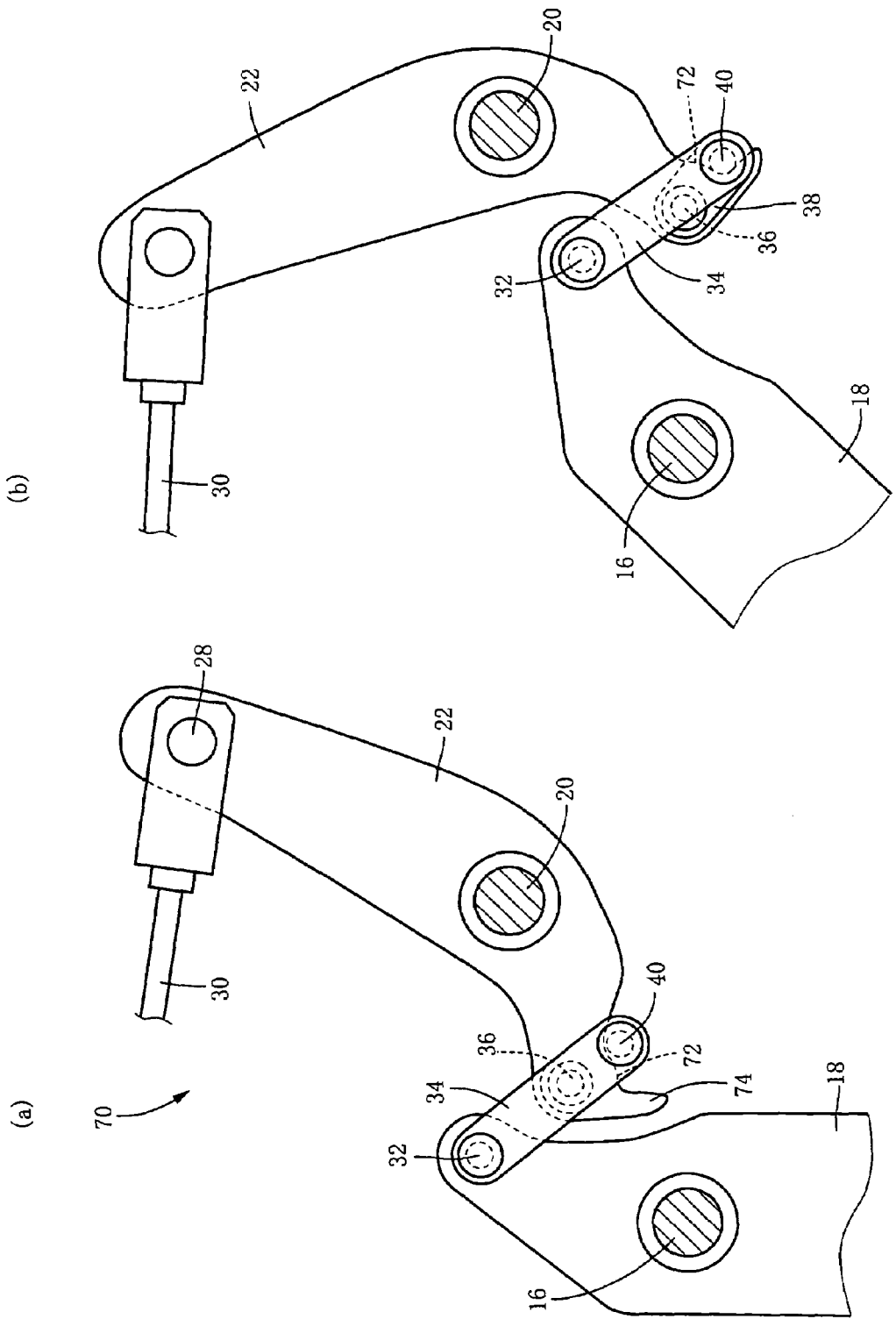
FIG. 7 is a view corresponding to FIG. 5 and explaining still another embodiment of the present invention.

In a brake pedal apparatus 70 of FIG. 7, a cutout 72 is provided, in place of the elongated hole 42 of the brake pedal apparatus 10, to allow movement of the third connecting pin 40 in the first region, and an engaging protrusion 74 provided in an end portion of the cutout 72 functions as the stopper. The engaging protrusion 74 is engageable with the third connecting pin 40 so as to inhibit pivot motion of the second link 38, establishing the second region in which the lever ratio is changed according to a lever ratio characteristic different from that in the first region, and therefore providing substantially the same effects as the brake pedal apparatus 10. The view (a) of FIG. 7 shows a state in which the pedal operating amount is zero, while the view (b) of FIG. 7 shows a state in which the operating pedal 18 is depressed to reach substantially its full stroke position.

Figure 8:
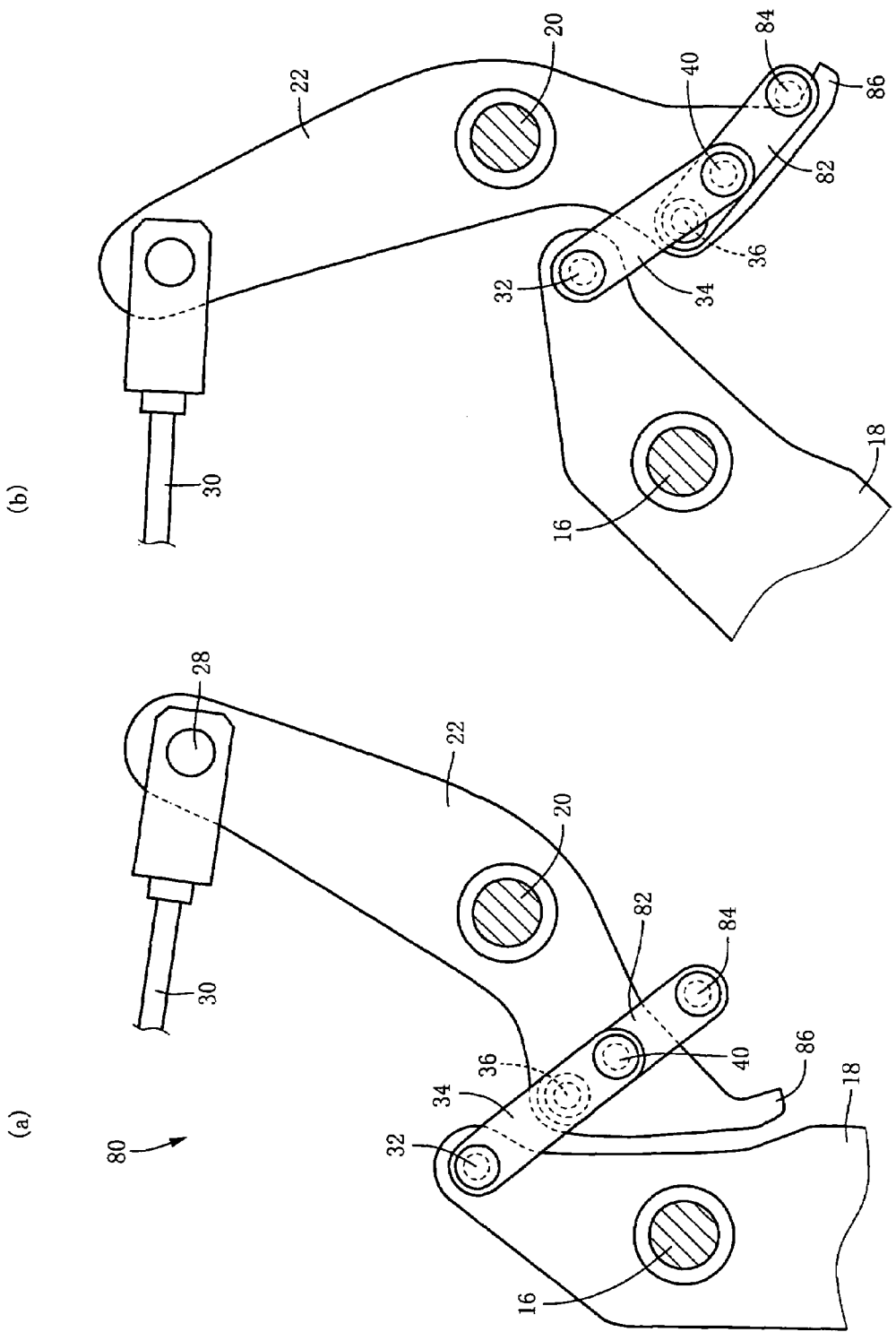
FIG. 8 is a view corresponding to FIG. 5 and explaining still another embodiment of the present invention.

In a brake pedal apparatus 80 of FIG. 8, a second link 82 is provided to be connected to the pivot member 22 via the second connecting pin 36. The second link 82 passes the third connecting pin 40 and projects toward one of opposite sides of the third connecting pin 40 that is remote from the second connecting pin 36. An engaging pin 84 provided in a distal end of the second link 82 is engageable with an engaging protrusion 86 provided in the pivot member 22 so as to inhibit pivot motion of the second link 38, thereby establishing the second region. In the present embodiment, each of the first and second links 34, 82 is provided by a single member that is disposed on a front side as seen in FIG. 8. The first and second links 34, 82 are connected to each other, pivotably relative to each other, via the third connecting pin 40 that is arranged not to interfere with the pivot member 22. The view (a) of FIG. 8 shows a state in which the pedal operating amount is zero, while the view (b) of FIG. 8 shows a state in which the operating pedal 18 is depressed to reach substantially its full stroke position.

In this embodiment, too, it is possible to obtain the same effects as in the above-described brake pedal apparatuses 10, 70. In addition, since a distance from the second connecting pin 36 to the engaging pin 84 is larger than a distance from the second connecting pin 36 to the third connecting pin 40, a movement amount of the engaging pin 84 is amplified depending on the lever ratio, thereby making it possible to highly accurately control the intermediate position SP1 in which the engaging pin 84 is brought into contact with the engaging protrusion 86 functioning as the stopper, namely, the boundary between the first and second regions. In this embodiment, the engaging pin 84 brought into contact with the engaging protrusion 86 functions as the engaging portion brought into contact with the stopper. However, a stopper pin or like may be provided on a side surface of the pivot member 22 (a front side surface of the pivot member 22 as seen in FIG. 8), so as to be engageable with, for example, a side end edge of the second link 82.

A brake pedal apparatus 90 of FIG. 9 is different from the above-described brake pedal apparatus 10 with respect to the position of the second connecting pin 36 and the position and length of an elongated hole 92 extending along an arc whose center corresponds to the second connecting pin 36. While the operating pedal 18 is positioned between its home position (in which the pedal operating amount is zero): as shown in the view (a) of FIG. 9 and a predetermined intermediate position, the third connecting pin 40 is held in contact with an end of the elongated hole 92, so that the second link 38 is positioned to be held in a constant attitude relative to the pivot member 22, whereby the first and second links 34, 38 are pivoted relative to each other. Thus, the lever ratio is changed according to a lever ratio characteristic that is substantially the same as in a case where the first link 34 is individually provided to be directly connected to the operating pedal 18 and the pivot member 22 via the connecting pins 32, 40 located in respective positions, as shown in the view (a) of FIG. 9. That is, in this embodiment, the second region is defined between the home position and the intermediate position. The end of the elongated hole 92 corresponds to the stopper, while the third connecting pin 40 serves also as the engaging portion that is to be brought into contact with the stopper.

When the pedal operating amount reaches the intermediate position of the pedal stroke, the third connecting pin 40 is positioned on a position which lies on a straight line connecting the first and second connecting pins 32, 36 and which is located outside the second connecting pin 36. While the pedal operating amount is larger than the intermediate position of the pedal stroke, the third connecting pin 40 is moved within the elongated hole 92, with constant attitudes of the first and second links 34, 38 having the third connecting pin 40 positioned on a straight line connecting the first and second connecting pins 32, 36, as shown in the view (b) of FIG. 9, so that the lever ratio is changed according to a lever ratio characteristic that is substantially the same as in a case where the first and second connecting pins 32, 36 are connected via a single link. In this embodiment, the first region is provided by this region in which the pedal operating amount is larger than the intermediate position. The view (b) of FIG. 9 shows a state in which the operating pedal 18 is depressed to reach substantially its full stroke position.

That is, in this embodiment, contrary to the above-described embodiments, a first half of the pedal stroke corresponds to the second region in which the first and second links 34, 38 are pivoted relative to each other, while a second half of the pedal stroke corresponds to the first region in which the first and second links 34, 38 are displaced integrally with each other. However, this embodiment is identical with the above-described embodiments in that the lever ratio characteristics in respective regions can be set independently of each other, and in that the intermediate position can be changed by changing the length dimension of the elongated hole 92, namely, by changing the position of the end of the elongated hole 92 with which the third connecting pin 40 is to be brought into contact, so that the first and second regions can be suitably defined. Thus, the present embodiment provides the same effects as the above-described embodiments.

The embodiments of the present invention have been described in detail with reference to the drawings. However, the described embodiments are merely embodied forms, and the present invention can be embodied with various modifications and improvements on the basis of knowledge of those skilled in the art.

The invention claimed is:

1. A brake pedal apparatus comprising:
   (a) an operating pedal which is to be depressed so as to be pivoted about a first axis;
   (b) a pivot member which is pivotable about a second axis parallel to the first axis, and which is connected to the operating pedal via a link mechanism so as to be pivoted about the second axis in response to a depression of the operating pedal; and
   (c) an output member which is to receive an output generated upon pivot motion of the pivot member,
   wherein the link mechanism includes a first link which is connected to the operating pedal via a first connecting pin parallel to the first axis and which is pivotable about the first connecting pin relative to the operating pedal,
   wherein the link mechanism further includes a second link which is connected to the pivot member via a second connecting pin parallel to the second axis and which is pivotable about the second connecting pin relative to the pivot member,
   wherein the first and second links are connected to each other via a third connecting pin, and are pivotable about the third connecting pin relative to each other,
   wherein the first and second links are integrally displaced with constant attitudes thereof that have the third connecting pin positioned on a straight line connecting the first and second connecting pins, while the operating pedal is in a first region of a pedal stroke thereof,
   and wherein one of the first and second links is inhibited from being pivoted relative to one of the operating pedal and the pivot member that is connected to the one of the first and second links via a corresponding one of the first and second connecting pins, and is caused to be pivoted about the third connecting pin relative to the other of the first and second links, while the operating pedal is in a second region of the pedal stroke that is different from the first region.

2. The brake pedal apparatus according to claim 1, wherein the one of the first and second links is in contact with a stopper provided in the one of the operating pedal and the pivot member, so as to be unpivotably positioned relative to the one of the operating pedal and the pivot member, while the operating pedal is in the second region of the pedal stroke.

3. The brake pedal apparatus according to claim 1, wherein the output member receives one of a pressing force and a tensile force as the output generated upon the pivot motion of the pivot member.

4. The brake pedal apparatus according to claim 2, wherein the stopper is in contact with the third connecting pin whereby the one of the first and second links is unpivotably positioned relative to the one of the operating pedal and the pivot member, while the operating pedal is in the second region of the pedal stroke.

5. The brake pedal apparatus according to claim 2,
   wherein the one of the first and second links, which is in contact with the stopper while the operating pedal is in the second region of the pedal stroke, includes a projecting portion projecting from the third connecting pin toward one of opposite sides of the third connecting pin that is remote from the first and second connecting pins,
   and wherein the projecting portion of the one of the first and second links has an engaging portion, which is to be in contact with the stopper while the operating pedal is in the second region of the pedal stroke.

6. The brake pedal apparatus according to claim 1, wherein one of the first and second connecting pins is located between the other of the first and second connecting pins and the third connecting pin while the operating pedal is in the first region of the pedal stroke.

7. The brake pedal apparatus according to claim 1, wherein the third connecting pin is located between the first and second connecting pins while the operating pedal is in the first region of the pedal stroke.

8. The brake pedal apparatus according to claim 2,
   wherein the stopper is provided in the pivot member,
   and wherein the second link is in contact with the stopper so as to be unpivotably positioned relative to the pivot member, while the operating pedal is in the second region of the pedal stroke.

9. The brake pedal apparatus according to claim 2,
   wherein the stopper is provided in the operating pedal,
   and wherein the first link is in contact with the stopper so as to be unpivotably positioned relative to the operating pedal, while the operating pedal is in the second region of the pedal stroke.

10. The brake pedal apparatus according to claim 4,
    wherein the third connecting pin is received in an elongated hole that is formed in the one of the operating pedal and the pivot member,
    wherein the third connecting pin is movable in the elongated hole for allowing the one of the first and second links to be pivoted relative to the one of the operating pedal and the pivot member, while the operating pedal is in the first region of the pedal stroke,
    and wherein the third connecting pin is in contact with an end of the elongated hole which serves as the stopper for inhibiting the one of the first and second links from being pivoted relative to the one of the operating pedal and the pivot member, while the operating pedal is in the second region of the pedal stroke.

* * * * *

UNITED STATES PATENT AND TRADEMARK OFFICE
CERTIFICATE OF CORRECTION

PATENT NO. : 7,448,296 B2
APPLICATION NO. : 11/401838
DATED : November 11, 2008
INVENTOR(S) : Akihiko Fukase It is certified that error appears in the above-identified patent and that said Letters Patent is hereby corrected as shown below:

Title Page, item (57), delete the abstract in its entirety and insert therefor:

--A brake pedal apparatus including: (a) an operating pedal; and (b) a pivot member connected to the operating pedal via a link mechanism so as to be pivoted in response to a depression of the operating pedal. The link mechanism includes (i) a first link pivotably connected to the operating pedal via a first connecting pin, and (ii) a second link pivotably connected to the pivot member via a second connecting pin. The first and second links are connected via a third connecting pin, and are pivotable about the third connecting pin relative to each other. The first and second links are integrally displaced with the third connecting pin being held positioned on a straight line connecting the first and second connecting pins, during a first region of a pedal stroke of the operating pedal. The first or second link is inhibited from being pivoted and is caused to be pivoted about the third connecting pin relative to the other link, during a second region of the pedal stroke.--

Signed and Sealed this

Seventeenth Day of August, 2010

David J. Kappos
*Director of the United States Patent and Trademark Office*